United States Patent Office 3,279,019
Patented Oct. 18, 1966

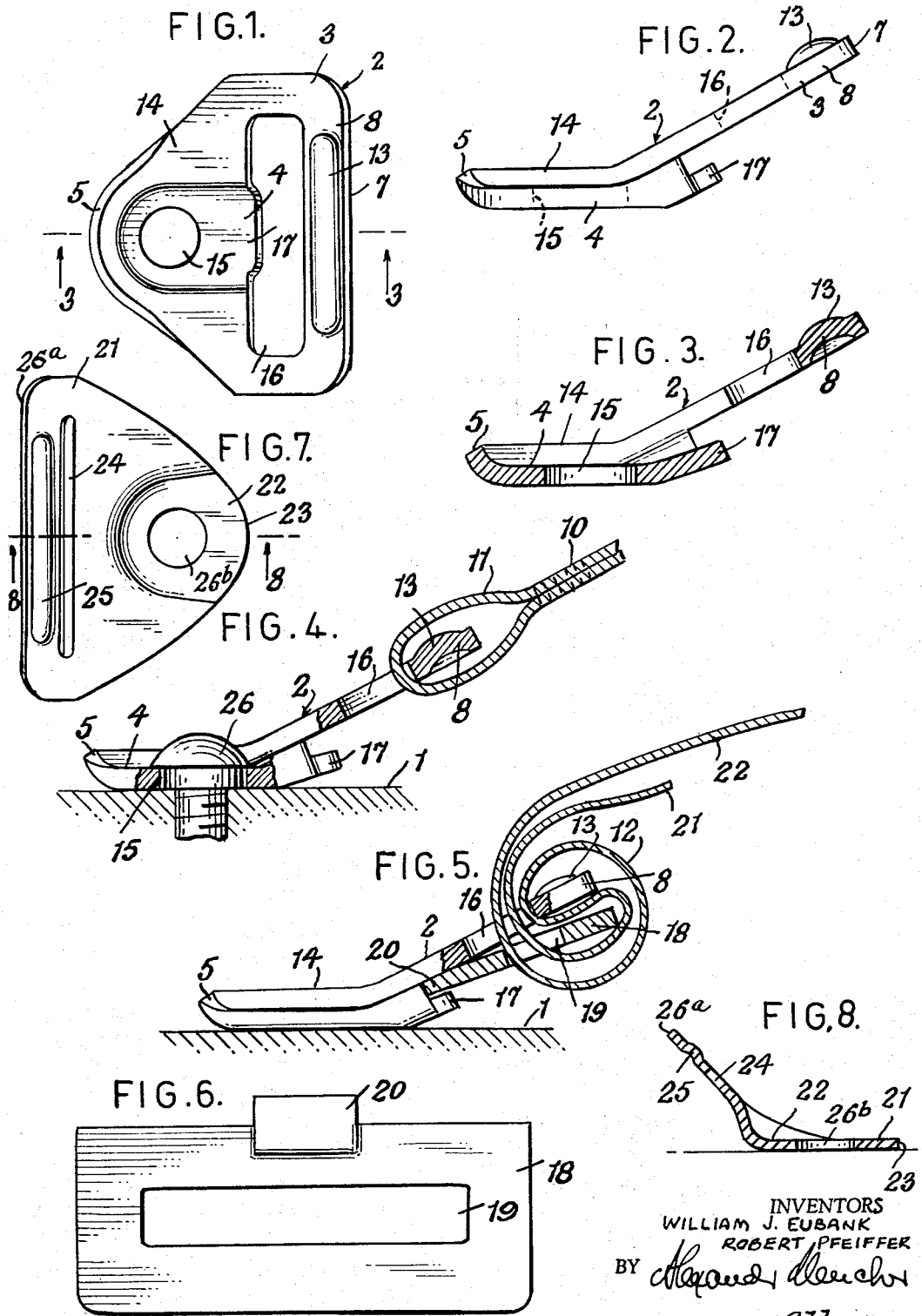

3,279,019
ANCHORING MEANS FOR SAFETY SEAT BELTS
William J. Eubank and Robert Pfeiffer, Livonia, Mich., assignors to American Safety Equipment Corporation, New York, N.Y., a corporation of New York
Filed Oct. 29, 1964, Ser. No. 407,430
4 Claims. (Cl. 24—265)

This invention relates generally to anchoring means for safety seat belts of the character employed in airplanes, automobiles and for other purposes.

The structure has particular reference to a swiveling type of mounting plate for attachment to the floor or other supporting part of the vehicle adjacent to the seat and to which one end of the belt is either fixedly or adjustably secured.

One of the objects of the invention is to provide an anchorage of the kind mentioned in which a belt end can either be fixedly or adjustably arranged and wherein the flood-contacting or supporting area of the mounting plate is relatively small so that the plate can freely swivel and can be readily mounted on bends, corners or other small or restricted areas of the car floor or other support.

It is another object of the invention to provide a plate having a freely swiveling mounting, wherein said plate will be reinforced at a point where the belt-pull is at a maximum and which will lie relatively close to the floor or other support when mounted and which will co-operate with a snubbing plate to insure proper belt engagement and prevent slippage of the belt during its use.

More particularly, the invention contemplates the provision of a plate having an elongated slot through which a belt is passed to loop about a reinforced cross piece, the plate having a tapered end formed with a depressed area the under surface of which forms a floor- or vehicle-contacting region of small area. Said depressed area has an opening through which a shouldered bolt or screw may be passed to attach the plate to the floor or other support of the car or vehicle.

The invention further contemplates the provision of an angular lip for co-operation with a snubber plate to enable a belt-end to be adjustably attached to the swivel plate without fear of belt slippage.

These objects and other incidental ends and advantages of the invention will hereinafter appear in the progress of the disclosure and as will be pointed out in the appended claims.

In the accompanying drawing showing an illustrative embodiment of the invention, FIG. 1 is a top plan view of a swivel plate or belt anchorage constructed in accordance with the invention;

FIG. 2 is a side elevational view of the same;

FIG. 3 is a sectional view taken substantially on the line 3—3 of FIG. 1, looking in the direction of the arrows;

FIGURE 4 shows the swivel plate attached to a car floor or other supporting surface, with an end of the safety belt permanently attached to the plate;

FIG. 5 is a similar view, but showing the end of the belt adjustably connected to the plate and to a snubber plate;

FIG. 6 is a face view of a snubber plate such as that which can be employed in the adjustable arrangement shown in FIG. 5;

FIG. 7 is a plan view of another embodiment of the invention, and

FIG. 8 is a sectional view taken on the line 8—8 of FIG. 7 looking in the direction of the arrows.

The improved swivel plate is adapted to be attached to a suitable supporting surface 1, which may be the floor of an automobile, or other suitable location situated adjacent to the seat on which the safety belt is to be used. The swivel plate 2 is preferably of the shape shown and is preferably composed of metal. Said plate has a relatively wide portion 3 adjacent to one end and tapers as shown at 14 toward its opposite end, the latter having an upturned edge indicated at 5. At the wider portion of plate 2 is provided an elongated slot 16 and located between one edge thereof and the end 7 of the plate is a cross bar structure 8 around which an end portion of the belt 10 is looped as shown at 11 in FIG. 4 or at 12 in FIG. 5, the latter arrangement being an adjustable attachment for the belt.

Since cross bar 8 primarily receives the pull or load of the belt when the belt is in use, it is materially stiffened and strengthened against distortion by such means as an elongated rib 13 pressed out of it. It is further to be noted that that portion of the plate 2 in which slot 16 and rib 13 are located extends angularly upward from the tapered end of the plate so that this upwardly extending part of the plate is free from contact with the floor or other support when the plate is mounted thereon.

The tapered part 14 of plate 2 is provided with a depressed part 4 having a central opening or hole 15 through which a fastening element 26 is extended to mount the plate. The under surface of the depressed part 4 is the portion of the plate which contacts with the floor or other support 1. The fastening element 26 which is used to attach the plate to the floor or other support can be a shouldered screw or bolt or other equivalent fastening element as shown in FIG. 4. By the use of such a shouldered bolt or screw, the plate can be securely attached to the supporting surface and the plate will be capable of freely swiveling. Moreover, owing to the plate and the fact that a relatively small area of the same comes into contact with the floor or other supporting surface, it is possible to readily mount the plate near bends, corners or other parts of the car floor or support.

At one end of the depressed part or depression 4 may be provided a slightly upturned tab or lip 17 which may cooperate with the lip 20 of a snubber plate 18 one type of which is shown in FIG. 6.

When plate 2 is mounted at a suitable position on the floor or other location, one end of the belt may be attached to it through slot 16 as shown in FIG. 4, or through swivel and snubber plate slots 16 and 19 as shown in FIG. 5. In the arrangement shown in FIG. 4, the end of the belt is looped around the ribbed cross bar 8 and the overlying parts of the loop are stitched together to provide for a permanent, non-adjustable attachment of the belt to the plate.

When it is desired, however, to provide for an adjustable attachment of the end of the belt to the plate, the arrangmeent shown in FIG. 5 is followed. Thus, the end of the belt is provided with a snubber plate, an example of one of these plates being shown in FIG. 6. The plate therein shown is an elongated flat piece provided with a slot 19 through which the belt is passed as shown in FIG. 5. One edge of the snubber plate as shown is formed with a projecting lip 20 to engage swivel plate lip 17. However, lips 17 and 20 are not necessary for co-operative use of the swivel and snubber plates when in coacting relationship as shown in FIG. 5.

In FIG. 5 the loaded end of the belt is indicated at 22 and the free end thereof at 21. When the belt is looped into position on the snubber plate and on the swivel plate in the manner shown, the pull exerted on the loaded end 22 of the belt will exert a pull on the snubber plate in a manner to result in a clamping effect on the belt so that parts thereof will be gripped between the snubber plate and swivel plate and withdrawal movement of the belt will be strongly resisted and the belt held against longitudinal sliding movement.

The lip 20 on the snubber plate 18 will fit over the lip 17 on the swivel plate 2 when such lips are used, thus tending to properly position and support the snubber plate relatively to the swivel plate and provide for the required coaction between these plates and secure the required snubbing action.

The structure described is such that the swivel plate can be used for the permanent attachment of a belt-end as shown in FIG. 4 or as a means for providing for the adjustable attachment of the belt-end. It has a relatively small area for floor contact and thus can be readily attached in close quarters on the floor of the car. Moreover, this small contact area and its manner of mounting affords a large degree of swiveling action. The cross bar of the plate may be strongly reinforced to prevent distortion under the pull of the belt and co-operation between parts of the snubber plate and swivel plate is such that a positive and effective operation is attained to prevent slippage of the belt under all conditions of use.

In the embodiment shown in FIGS. 7 and 8 the plate 21 shown therein has its depressed area 22 extending inwardly from the smaller end 23 of the plate and such area terminates short of the slot 24. In this embodiment the reinforcing rib 25 may be provided between the slot 24 and the larger end 26a of the plate. The fastener-receiving hole 26b passes through the depressed area 22.

Having thus described preferred embodiments of the invention, it is understood that minor changes and variations in the structures and parts may all be resorted to without departing from the spirit of the invention and the scope of the appended claims.

We claim:

1. A swivel device for safety belts comprising a swivel plate and a snubber plate, the swivel plate having a relatively wide, angularly and upwardly inclined end portion formed with an elongated slot defining a cross bar between it and one edge of the swivel plate, the swivel plate tapering from said wide portion to a narrower opposite end, the latter end terminating in an upturned edge, said tapered part of the swivel plate having a central depression, the under side of said depression engaging against the floor or other mounting surface on which the swivel plate is supported, the depression having a central hole to receive a mounting element, the cross bar being provided with an elongated stiffening rib, said snubber plate having a slot and being adapted to engage the underside of the inclined end portion of said swivel plate, with the slots of the swivel and snubber plates in registration, said inclined end portion having a projecting lip, and the snubber plate having a lip adapted to be disposed over the lip on the swivel plate, said end bar and slots being so related that a tensioned belt end passed about said swivel and snubber plates and through said slots holds the lip of said snubber plate against said swivel plate.

2. A swivel device for safety belts comprising a swivel plate having a relatively wide, angularly and upwardly inclined end portion formed with an elongated slot defining a cross bar between it and one edge of the swivel plate, the swivel plate tapering from said wide portion to a narrower opposite end, the latter end terminating in an upturned edge, said tapered part of the swivel plate having a central depression, the under side of said depression engaging against the floor or other mounting surface on which the plate is supported, the depression having a central hole to receive a mounting element, the cross bar being provided with an elongated stiffening rib, the depression terminating at one end in an upturned lip directed toward the slot, and a snubber plate having an aperture defining a cross bar about which a belt end may extend, said snubber plate having a lip at one end overlying the lip on the swivel plate when the belt end is looped around the cross bar and is extended through the aperture in the snubber plate.

3. A safety belt connection device comprising the combination of a swivel plate and a snubber plate, said swivel plate having a tapered portion at one end, said portion being provided with a depression, the under surface of the depressed portion being adapted to contact with a floor or other surface, a fastener-receiving opening through said depressed portion and through which a mounting element is extended to secure the plate to a floor or other surface, the swivel plate having a slot extending crosswisely, said slot defining a cross bar between it and one end of the swivel plate, said cross bar being reinforced by a rib, the portion of the swivel plate bearing the cross bar extending angularly upwardly from the depressed part of the said plate, the snubber plate being provided with a slot extending crosswisely of said snubber plate, said snubber plate being adapted to be disposed behind the angularly upwardly extending portion of the swivel plate and with the swivel and snubber plate slots at least partly in registration, said snubber plate being held in position by a belt-end, said snubber plate having a projecting lip on one edge and the swivel plate having a lip behind which that on the snubber plate fits when held in position by the belt end.

4. A safety belt connection means comprising the combination of a swivel plate and a snubber plate, the swivel plate having a depressed portion having an under surface adapted to rest against the floor or other surface, a fastener-receiving opening extending through the depressed portion to receive a mounting element to secure the swivel plate to the floor or other surface, the swivel plate having a crosswise slot defining a cross bar between it and one end of the plate, the portion of the swivel plate bearing the cross bar extending angularly upwardly from the depressed portion of the said plate, the swivel plate being provided with an upturned lip at one edge of the crosswise slot, the snubber plate having a projecting lip fitting behind the angularly upwardly extending portion of the swivel plate, said snubber plate having a slot in it so as to define a cross bar between it and one edge of said plate, the device being adapted to receive a belt end about the cross bar of the snubber plate and through the slot in the swivel plate so as to hold said belt end tightly in engagement with said swivel and snubber plates.

References Cited by the Examiner
UNITED STATES PATENTS

| | | | |
|---|---|---|---|
| 1,373,013 | 3/1921 | Minnis | 24—223 |
| 2,585,894 | 2/1952 | Becker | 24—77 |
| 2,790,222 | 4/1957 | Creedon | 24—77 |
| 3,046,056 | 7/1962 | Greene et al. | |

WILLIAM FELDMAN, *Primary Examiner.*

E. SIMONSEN, *Assistant Examiner.*